Aug. 19, 1969  D. C. DUNKLEY  3,462,032
PLANAR MOVING LOADING DEVICE

Filed June 4, 1965  5 Sheets-Sheet 1

INVENTOR
DAVID C. DUNKLEY

Aug. 19, 1969   D. C. DUNKLEY   3,462,032
PLANAR MOVING LOADING DEVICE

Filed June 4, 1965

INVENTOR;
David C. Dunkley
By W. B. Harpman
ATTORNEY

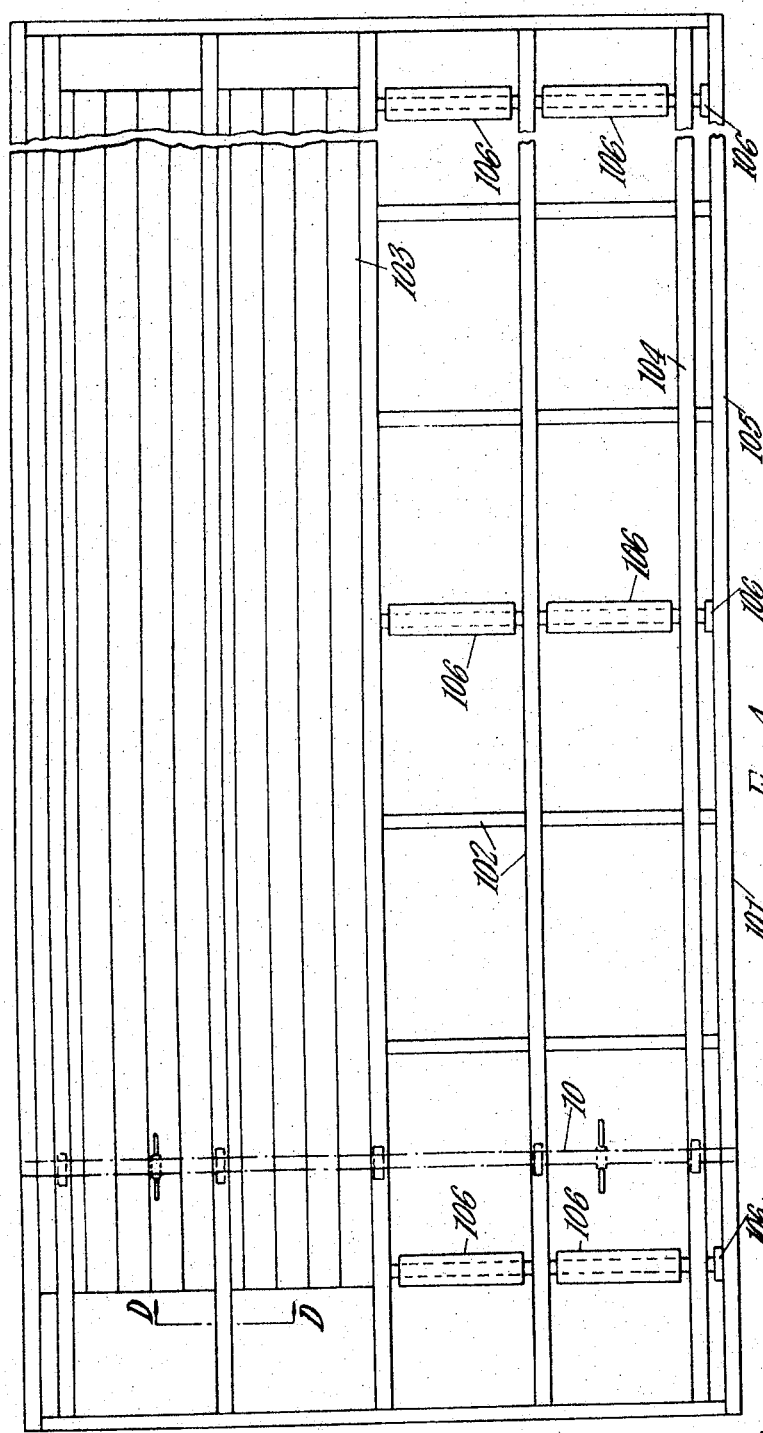

Aug. 19, 1969     D. C. DUNKLEY     3,462,032
PLANAR MOVING LOADING DEVICE
Filed June 4, 1965     5 Sheets-Sheet 4

INVENTOR:
David C. Dunkley
By W. B. Harpman
ATTORNEY

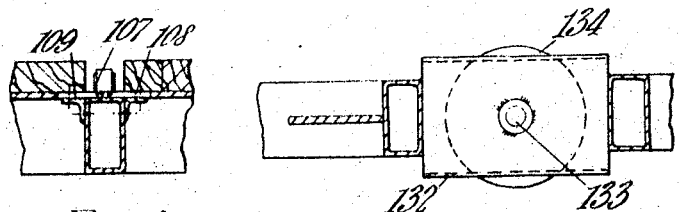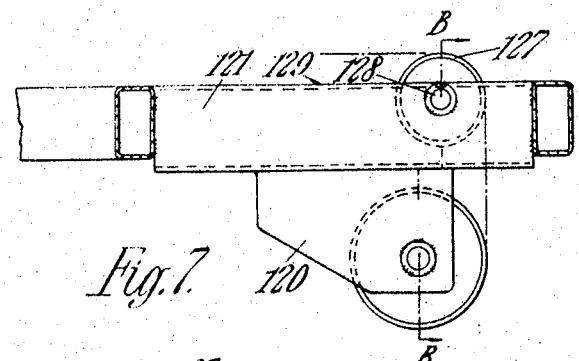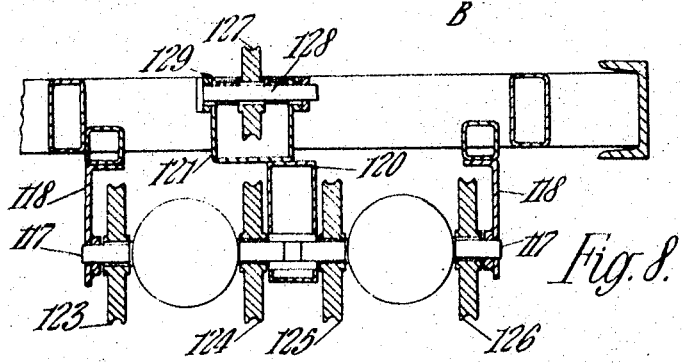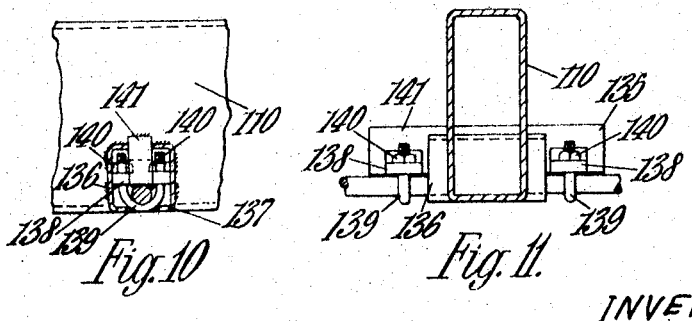

United States Patent Office 3,462,032
Patented Aug. 19, 1969

3,462,032
PLANAR MOVING LOADING DEVICE
David C. Dunkley, Old Park Farm, Toddington, Bedfordshire, England
Filed June 4, 1965, Ser. No. 461,558
Claims priority, application Great Britain, June 4, 1964, 23,187/64, Patent 1,117,901
Int. Cl. B60p 1/22
U.S. Cl. 214—83.24                                    5 Claims

ABSTRACT OF THE DISCLOSURE

A load moving member having planar movement including a plurality of fluid pressure cylinders, rams, pulleys and a cable trained over the pulleys whereby the planar distance that the load moving member can be moved is greater than the stroke of any of the rams.

---

The present invention relates to a device for moving loads and one which may be mounted either on a stationary site or on a vehicle such as a lorry or trailer or rail wagon.

It is an object of the invention to provide such a device which undergoes a planar movement for the purpose of moving the load.

It is also an object of the invention to provide such a device which employs as a means of transmitting motive power, a hydraulically actuated pulley system so that a load-moving member may be power driven in either one of two directions.

It is a further object of the invention to provide such a device having a stationary flat and a moving headboard to effect movement of the load.

It is a further object of the invention to provide such a device having a moving flat by means of which the load is moved.

In one embodiment of the invention, the device comprises a chassis and a load-moving member mounted thereon for movement to and fro along the chassis; the chassis having means for transmitting motive power to the member so as to effect the movement thereof. The member may comprise a load-bearing flat or simply a headboard mounted across a stationary load-bearing flat, and the headboard may be formed by a length of steel box-section. The flat may be constructed so that as it moves off the chassis it can be taken round the edge of the chassis and backwardly thereof to underlie the chassis. Hereinafter and purely for the purpose of convenience in description, a flat of this construction will be referred to as a folding flat. The chassis may have a source of motive power mounted thereon to provide the motive power to be transmitted by said means which may consist of a pulley system actuated hydraulically. This means of moving the flat is not only simple but is, in practice, efficacious and has the advantage of making it possible to mount the actuating member of the hydraulic system so that it lies within the chassis. The chassis, when the actuating member is so mounted, limits the maximum stroke of the actuating member and if the flat were acted on directly by this member, the stroke thereof might not be, and generally would not be, sufficient to move the flat through the distance it is to be moved. However, by the use of a pulley system the flat can be moved any distance chosen for any given stroke of the actuating member. Hydraulic rams are employed to actuate the pulley system. The rams may be single-acting, at least one such ram being provided for movement of the member in one direction and at least one for movement of the member in the opposite direction. Two pairs of such rams may be provided each pair having a rope to which the member is secured, and one of each pair being for movement of the member in one direction and one for movement of the member in the opposite direction. Alternatively, double-acting rams may be used; the ram or each ram on one stroke effecting movement of the member in one direction, and on the return stroke, movement in the opposite direction. To facilitate movement of the member, it may be mounted on sliders or rollers but in the use of a folding flat, the flat is preferably mounted on and secured to endless chains having roller links and carried on beams of the chassis so that as the flat moves the beams act as a guide around which the chains move. However, a length of such chain may be used secured in a fixed position so that the member bears on the rollers as it is moved. The folding flat need not be wound up or taken underneath the chassis as it moves thereoff but may be allowed to come off freely so that it can be laid on a ramp or loading area to receive the load and then by the reverse movement carry the load on to the chassis and the moving flat may be provided with a headboard.

The device of the invention may be located on a stationary site or mounted on a vehicle and the flat may be made moveable but of a rigid structure. With a flat of this structure, however, it would be desirable to move the flat off the chassis to overlie and rest upon some supporting surface such as a loading bay, otherwise the load might break the chassis or, if mounted on a vehicle, tip the vehicle over.

The device of the invention may be mounted on a scissors hoist or other form of lifting device so that it can load and off-load at different heights, and the scissors hoist may be single-acting i.e. power driven in the lifting movement only; or double-acting i.e. power driven in both the lifting movement and the movement of retraction. Preferably, the scissors hoist employed is a double-acting one with the power retraction effected by hydraulic rams located in the plane of the upper and/or lower ends of the beams of the scissors.

The device of the invention may be used on vehicles which need to be side loaded, especially railway trucks, and a device with a folding flat operated by a hydraulically actuated pulley system, is particularly well suited for such use. Devices of the invention may be used in pairs so that each loads from and off loads to the other, i.e. one of the pair may be monted on a vehicle and the other at a stationary loading bay.

Embodiments of the invention will now be described, by way of example only, with reference to the accompanying drawing, in which:

FIGURE 4 is a plan view from above of a further embodiment of the invention in which the headboard moves but in which the flat is stationary; part of the flat having been removed to expose underlying structure;

FIGURE 5 is a plan view from below of the device of FIGURE 4;

FIGURE 6 is a section on the line D—D of FIGURE 4;

FIGURE 7 is a section taken on the line A—A of FIGURE 5;

FIGURE 8 is a section taken on the line B—B of FIGURE 7;

FIGURE 9 is a section taken on the line C—C of FIGURE 5;

FIGURE 10 is a front elevation of a detail of the headboard; and

FIGURE 11 is a side elevation of the detail of FIGURE 10.

Figure 2:
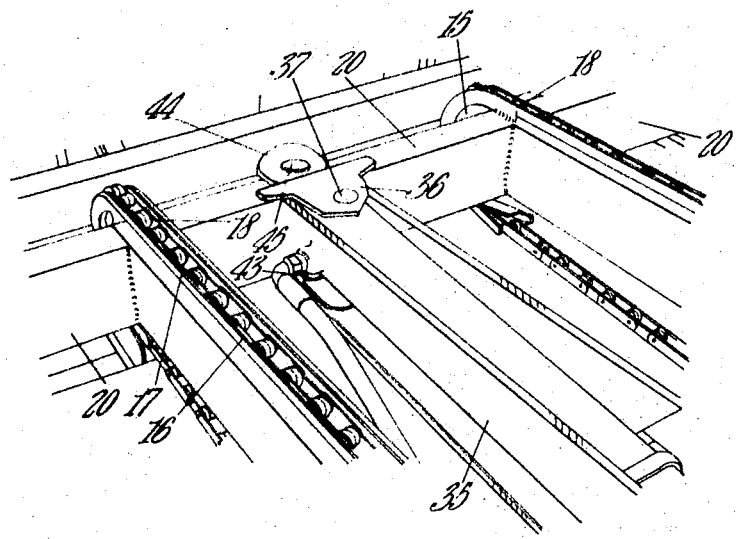
FIGURE 2 is a detail of an exposed part of the view of FIGURE 1, at the head of the flat.

The chassis of the device indicated at 1 is mounted in a three-sided frame indicated at 2 carried by the top frame 3 (see FIGURE 3) of the scissors hoist. The three-sided frame consists of three girders 4, 5, 6, respectively, of shallow channel section welded together with the channels facing inwardly and bolted to transverse beams of the top frame 3 of the scissors hoist. The scissors hoist nad the trailer are of well-known conventional structures and since they are not per se part of the invention, they will not be further described. The three-sided frame 2 is bolted to the top frame of the scissors hoist so that the transverse girder 5 lies at the head of the trailer and the open side or mouth of the frame at the tail end and the side girders 4 and 6 each have welded to their top flanges, an inverted channel selection 7, $7^1$ running the entire length of the girders; each of the inverted channel sections having, of the opposed limbs, one, limb 8, deeper than the other limb 9 with the limb of greater depth welded to the top flange of the side girder so that the roof 10 and the shallower limb 9 of the section overlie the space within the frame. The chassis of the device comprises four girders 11, 12, 13 and 14 respectively, disposed parallel, equally spaced apart and lying on a fore and aft line of the trailer and each being rounded as shown at 15 (FIGURE 2) at its ends and having formed along its upper surface and round its ends, a shallow channel 16 in which an endless roller chain 17 having roller links 18 is mounted. For convenience of description, these four girders will hereinafter be referred to as the longitiudinal beams of the chassis. The longitiudinal beams of the chassis are joined by transverse girders 20 running between them slightly short of their rounded ends to form the main part of the chassis which is braced by cross-girders 21 passing between the outer and inner longitudinal beams of the chassis at the transverse centre line thereof. The chassis is mounted so that the outer longitudinal beams 11, 14 thereof partly lie within the channels of the side girders 4, 6 respectively of the three-sided frame with the inverted channel sections 7, $7^1$ of the latter overlying the chains of the outer longitudinal beams and with one end of the chassis extending into the channel of the transverse girder 5 of the three-sided frame and the other end of the chassis lying at the open side of the latter frame; the chassis being mounted so that the undersides of the longitudinal beams are spaced apart from the lower flanges of the three-sided frame to allow the chains of longitudinal beams to pass therearound. The chassis is secured in this position by webs (not shown) at each end to which the side girders 4, 6 of the three-sided frame and the outer longitudinal beams 11, 14 are welded, although any suitable means may be employed for this purpose.

Figure 1:
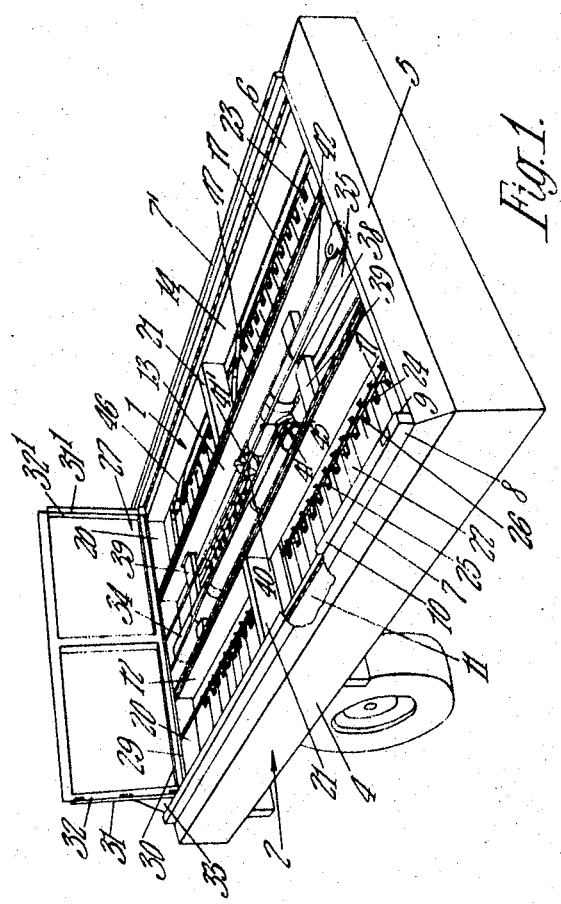
FIGURE 1 is a perspective view from above of a folding flat device of the invention, with part cut away, and with the device mounted on a scissors hoist carried on a two-wheeled trailer; the view showing the flat in a position in which the chassis is exposed.

The flat of the device consists of stout slats indicated at 22 e.g. wooden boards, laid across the chassis and attached to the chains thereof. For this purpose, the links of the chains underlying a slat each carry a bracket 23 providing a flange 24 running across the upper surface of the chain and the channel in which the chain lies, and being drilled on either side of the chain, and the slats, with the exception of the last slat at the head of the flat, are provided with bores aligned with the bores in the transverse flanges, and bolts 25 are passed through the aligned bores and held by nuts 26 to secure the slats to the chains. The structure of the flat is best shown in FIGURE 1 but it will be understood that because of the position of the flat as shown in this figure, the brackets 23 and the slats of the flat are seen in their inverted positions.

The flat may be covered by any tough, resilient material 22 (FIGURE 3) e.g. rubber, and may carry a headboard 27. The headboard may be formed of a metal pressing 28 and for the purpose of securing such headboard, the last slat at the head of the flat may be constituted by a steel box-section 29 of the same dimensions as the remainder of the slats and having the brackets of the chains underlying the box-section welded thereto rather than bolted. The metal pressing 28 is formed at its lower edge with an inverted L-shaped channel section 30 which seats on the slat 29 and is welded thereto; the width of the headboard being slightly less than the width of the slats 29 to leave clearances, one either side of the headboard. Two posts 31, $31^1$ are erected on the slat 29 in these clearances; the posts being welded at their lower ends to the slat 29 and the headboard provides two vertical flanges 32, $32^1$ one at each side edge of the headboard, which are welded to respective posts 31, $31^1$ at the side edge thereof facing away from the tail of the flat. The posts also have welded to them at the opposite side thereof triangular plates 33, $33^1$ (FIGURES 1 and 3) so that one side of each of the plates rests on the flat. This side of each plate provides an inwardly directed flange (not visible) which is bolted to the next following slat through bores in the flange and the slat. By this means, the headboard is rigidly supported and resists deflection on being acted upon by any load on the flat. It will be understood that since the last two slats at the head of the flat are secured together by the plates 33, $33^1$, they cannot move in relation to one another and are not, therefore, taken over the tail end of the chassis when the flat is moved thereoff as shown in FIGURE 1.

The movement of the flat is effected through a pulley system actuated by two hydraulic rams 34, 35 positioned parallel and lengthwise between the two inner longitudinal beams 12, 13 of the chassis, one facing the tail end of the chassis and the other, the head of the chassis. The rams are each located at the closed end of the cylinder between the fingers 36 (FIGURE 2) of a bracket welded or bolted to a transverse girder 20 of the chassis and whose fingers are bored to take a pivot pin 37 to pass through a trunnion provided in the ram, and also at substantially the transverse centre line of the ram by a pair of saddles 38 lying on opposite sides of the cylinder and bolted on each side of the cylinder to cross-girders 39 welded to and extending from the respective longitudinal beams 12, 13.

Each ram at the exposed end of the piston rod is bored to carry a transverse pin 40 which projects beyond the piston rod at each side to provide a stub shaft thereat one of which on the side nearest the other ram, carries a pulley wheel 41, $41^1$ and the other of which provides an anchorage point (not visible) for one end of the wire rope 42 of the pulley system. In alignment with each ram a mounting is provided in a transverse end girder of the chassis for a pair of pulley wheels 43, 44 (see particularly FIGURE 2); the mounting consisting of a vertical bore carrying a shaft 45 passing out of the bore above and below to provide stub shafts each of which carries one of the pair of pulley wheels. The rope 42 of the pulley system is first anchored at one end to one of the above-mentioned anchorage points by being looped over the stub shaft and the runs of the rope at the neck of the loop secured together by U-bolts (not shown), then passed round the lower pulley wheel 43 of the pair lying at the rear of that ram to which the end is anchored, then round the pulley wheel 41, of $41^1$ as the case may be secured to that ram, then round the upper pulley wheel 44 of the pair of pulley wheels at the rear of that ram, then along the full elngth of the chassis and around the upper pulley wheel 44 of the other pair of pulley wheels, then round the pulley wheel 41 or $41^1$ as the case may be on the other ram, then round the lower pulley wheel 43 of the other pair of pulley wheels, and finally anchored at its remaining free end to the other anchorage point in a like manner to the anchorage of the first-mentioned end. The run of the wire rope passing the length of the chassis is secured, assuming the flat is in position fully on the chassis, at the head of the chassis to the terminal slat of the flat by a depending bracket (not shown) through which the run passes, acting on collars carried by the rope on either side thereof so that the flat moves with the pulley rope. Alternatively, U-bolts passing through the terminal slat of the flat may be used to pinch the wire rope between the bolts and the underside of the flat and the wire rope welded to the U-bolts. The stroke of the ram is about ⅓ the length of the flat but because of the pulley system, this stroke is sufficient to move the flat through the entire length of the chassis. It necessarily follows, that by increasing or decreasing the number of pulleys employed, flats of varying lengths will also be moved throughout their entire lengths for a given stroke of ram.

Hydraulic lines 46, 47 are passed to the rams through bores in the side girders of the three-sided frame from any hydraulic reservoir provided with a motive power source and a pump to pump the oil to the rams.

Figure 3:
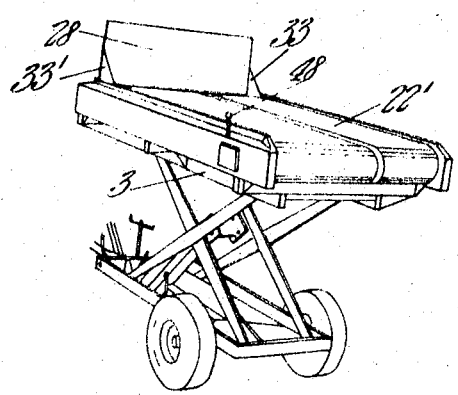
FIGURE 3 is a further perspective view of the device of FIGURE 1 showing the flat fully in position on the chassis.
Figure 3:
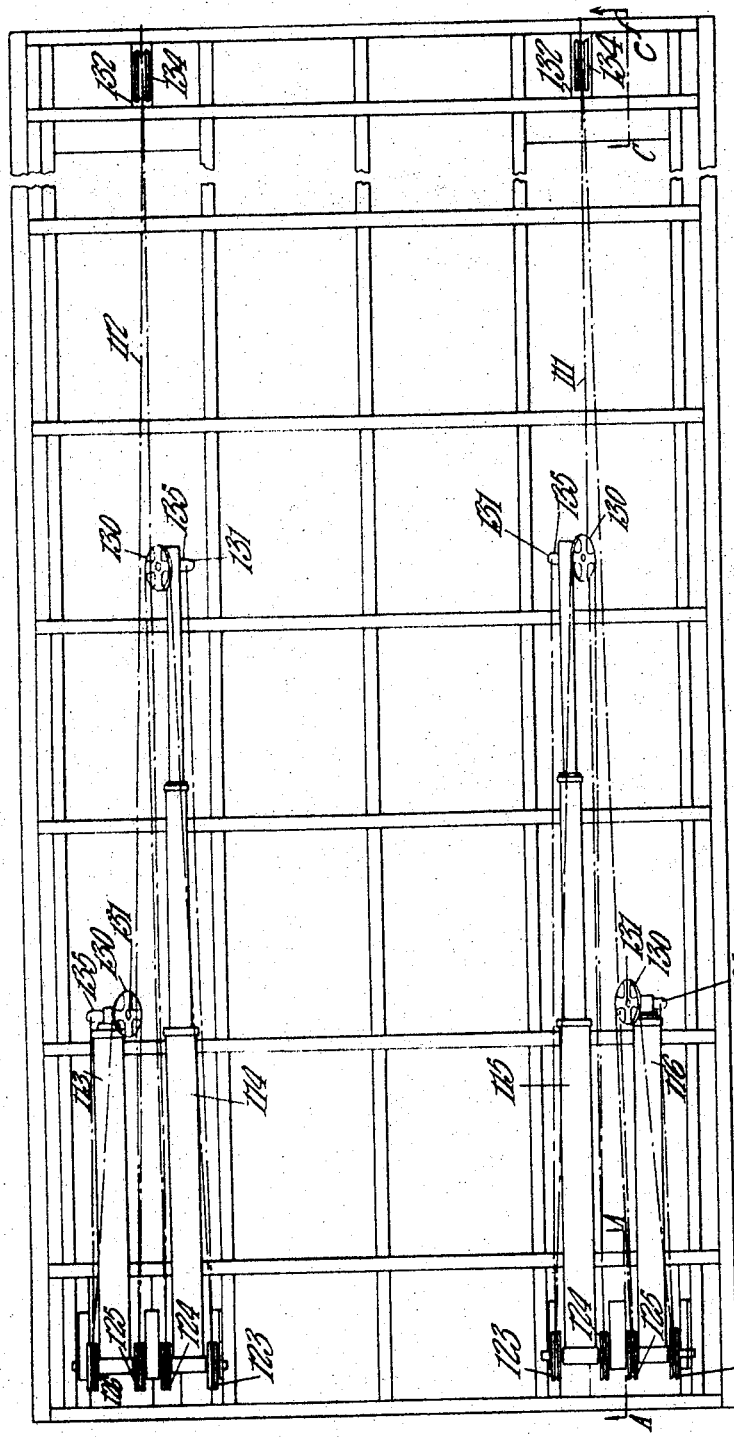

In operation, and assuming the flat is positioned fully on the chassis as shown in FIGURE 3, oil is delivered to the cylinder of the ram 34 to extend the ram and draw the pulley rope after it to move the flat so that the tail end is moved off the chassis and round with the chains until the ram has travelled its full stroke when most of the flat will underlie the chassis as shown in FIGURE 1 and the end formerly at the head of the chassis lies at the tail thereof. The flat is then taken back by delivering oil to the other ram. A manual control 48 (FIGURE 3) of the oil supply may be provided on the trailer or elsewhere so that the flat can be moved over any part of its maximum movement.

It will be understood that one double acting ram could be used in place of the two rams described above or that the two rams could be positively driven in each direction to work in a complementary manner, i.e., as oil is supplied to one ram to extend the ram, oil is simultaneously supplied to the other ram to cause it to withdraw.

The device as described above could be mounted on any vehicle and if needed conventional detachable tail and side boards could be mounted on the side girders of the three-sided frame.

Referring now to FIGURES 4 to 11, it may be seen that a modification of the chassis of the device may comprise a four-sided frame, generally indicated at 101, formed of four U-shaped channel sections welded together, so that the channel floors face inwardly, and braced by seven transverse and five longitudinal box-sections 102. These box-sections are welded to the inwardly directed floors of the frame members and cross each other by means of halving joints at which the two crossing sections are welded together, whereby all the box-sectioins 102 lie in the same plane. The transverse box-sections are surmounted by wooden planks 103 laid longitudinally between each adjacent pair of longitudinal box-sections and between the most outer disposed longitudinal box-sections 104 and each lateral member 105 of the frame 1, so as to leave the upper faces of the longitudinal box-sections 104 exposed; the planks 103 being bolted to underlying plates 106 welded to the upper surface of transverse box-sections as shown in FIGURE 4. On the upper surface of each longitudinal box-section a roller chain 107 is disposed (see FIGURE 6) to extend the length of the section and to lie slightly below the upper surface of the planks 103. Each chain is secured at each of two roller end-links by welding of each of the roller end links to a transverse plate 108 passing between the two rollers of the link and bolted at each side of the link to one limb of an L-shaped bracket 109 the other limb of which is welded to a vertical face of the longitudinal box-section 110; at a roller link mid-way along the length of the chain by welding of that link to a like transverse plate bolted at either side of the link to the centre transverse box-section, and at each of the remaining roller links by welding thereof to the longitudinal box-section. By this means, the rollers of the chains are able to rotate but nevertheless are firmly supported in a fixed position.

The headboard consists of a box-section 110 laid transversely across the flat and secured to two wire ropes 111 and 112 (see FIGURE 5) of a pulley system actuated by hydraulic rams so that the wire ropes can be moved by the hydraulic rams to move the headboard. Four telescopic single-acting hydraulic rams 113, 114 and 115 and 116 are employed in two pairs, one pair for each rope and one of each pair for movement in one direction along the flat and one of each pair for movement in the opposite direction. Each of the hydraulic rams is located at the closed end of the cylinder of the ram, and on the underside of the platform, by a trunnion (not visible) mounted on a steel pin 117 (FIGURE 8) held between a flange 118 welded to the underside of a box-section frame member 119, which in turn is welded to chassis members, and a box-section 120 welded to a further box-section 121 which is also welded to chassis members; and at the open end of the cylinder by yokes (not shown) welded to the underside of members of the chassis so that the rams lie in the longitudinal direction of the chassis with each pair disposed towards opposite sides of the platform. The pins 117 on which the closed ends of the cylinders are mounted also carry pulley wheels 123, 124, 125 and 126 to provide a pair of pulley wheels flanking the closed end of each cylinder. Thus, there are four such pulley wheels on each side of the platform and the pulley wheels on each side counting from the inner aspect of the platform to the outer aspect will hereinbelow be referred to as the first, second, third and fourth pulley wheels respectively. The box-section 121 on each side of the chassis under which the rams are mounted carries a further pulley wheel 127 mounted on a pin 128 held in opposite facing walls of the box-section so that a further pulley wheel is mounted directly above and in the same plane as the second pulley wheel on each side of the platform with the further pulley wheel extending above the box-section 121 through a slot provided in the uppermost wall 129 thereof. A pulley 130 is also mounted at the exposed end of the piston of each ram on one projecting portion of a pin 131 passing through a transverse bore in the piston to project either side thereof; and at the end of the flat remote to that at which pulley wheels 123 to 127 are mounted, a vertically aligned box-section 132 (see FIGURES 5 and 9) is welded between transverse box-sections at each side of the flat. Each of the two box-sections, thus provided, carries a pin 133 held in opposite facing walls of the box-section on which also is mounted a pulley wheel 134 so that the pulley wheel in each box-section lies on a line passing longitudinally through the second pulley wheel lying on the same side as the box-section. Each of the wire ropes 111 and 112 is anchored to the pistons of the rams of the respective pairs of rams 113, 114, 115 and 116, on the other projecting portion 135 of the pin 131 at the exposed end thereof in any convenient manner, for exampe, by looping the end of the rope over the projection portion of the pin 131 and clamping the neck of the loop with U-bolts, bearing in mind that FIGURE 5 is a view from below and thus presents an uppermost surface as though it were a lowermost surface and vice versa, and assuming that each rope is attached first to the more inwardly disposed 114 and 115 of the pair of rams, the rope is then taken round, first over then under, the first pulley wheel 123, then round, first under then over, the pulley wheel 131 at the end of the piston of the above ram, then under the second pulley wheel 124, and over the pulley wheel 127 mounted directly thereabove, then along the length of the flat to pass round, first over then under, the pulley wheel 134 at the remote end of the platform, then back along the flat to pass round, first over then under, the third pulley wheel 125, then round, first over then under, the pulley wheel 130 at the exposed end of the other ram of the pair, then round, first under, then over, the fourth pulley wheel 126 and then, finally, anchored to the other ram 113 and 116 in the same manner as to the first-mentioned ram of the pair. The headboard of the platform is fixed to each of the two wire ropes on the run thereof passing from the pulley wheel 27 mounted directly above the second pulley wheel to the pulley wheel 34 at the remote end of the platform. This is achieved by clamping each run below the headboard to a member welded into an open ended box-section 36 which is itself welded into a cut out portion of the headboard 10. The box-section 36 is aligned in a longitudinal direction and the run of the wire rope passes through it in contact with the upper surface 37 of the lowermost wall thereof. It carries a slot in the upper wall thereof extending the full length of the box-section and welded into the slot is a further box-section 141 comprising said member of a length to project from each end of the slot and of a depth to sit on the top of the wire rope to which it is welded. The further box-section 14 is cut out in each of the side walls of each projecting portion from the level of the lowermost wall, to provide in each projecting portion oppositely facing apertures through which is passed a strip plate 38 welded to the lowermost wall of the further box-section to extend parallel to the headboard to project either side of the further box-section. There are thus two plates lying parallel to the headboard, one at each side thereof. The projecting portions of each plate are drilled to receive either side of the further box-section from below the plate, the limbs of a U-bolt 39 the shank of which together with the underside of the further box-section, forms an "eye" in which the wire rope is clamped by tightening nuts 40 on the limbs above the plate. It will be seen, therefore, that each wire rope in addition to being welded to the further box section is also clamped thereto by a U-bolt each side of the headboard.

The headboard also carries on its underside five short box-sections lengths (not shown) welded in cut outs in the headboards to act as runners on the rollers of the five chains respectively.

In operation of the headboard, corresponding rams, one in each pair, are extended to move the headboard from one end of the platform to the other and simultaneously retract the other rams and the other rams are then operated to effect the reverse movement of the headboard while simultaneously causing retraction of the first-operated rams.

The above-described embodiment may be mounted on a scissors hoist, and as a self-loading and unloading device, is primarily intended for use with a load carried in a box-container to which wheels can be or are attached to flank the container and to, lie clear of the sides of the flat. The box container may be taken on or off the flat at either end and in being taken on, the headboard is brought to the end at which the container is to be taken on, linked to the container and then moved to the other end of the flat to pull the container after it. The container will normally be provided on its underside with rails positioned to run on the rollers of the chains so that as the container passes on to the flat its weight is taken and so that when the container is fully on the flat no weight lies on the container wheels which, if detachable, may then be removed. However, if a scissors hoist is employed, the chains may be omitted from the flat and the rails from the container and wheels employed on the container to raise the floor thereof clear of the flat when the scissors hoist is fully retracted, the container then being pulled by the headboard to overlie the flat. The flat may then be raised by the scissors hoist to take the weight of the container. In off-loading the container the above-described movements are reversed with the headboard pushing the container. In order to secure the box-container to the flat, a locking mechanism comprising co-acting members located respectively on the box-container and the chassis of the flat, may be used. The above-described embodiment may also be used without operation of the headboard, to carry ordinary loads in which case the load is supported by the wooden planks with which the platform is surfaced.

The headboard may be linked to the container by mounting resiliently-loaded upstanding fingers in cut outs in the headboard to engage with slots in members provided on the box-container. These members may be formed by slotted box-sections welded to the underside of the containers at one end thereof and preferably the fingers are disposed so that a finger surmounts each roller chain.

What is claimed is:
1. A device for planar movement of a load including a chassis, a load moving member movably mounted on said chassis, a purality of fluid pressure cylinders and rams on said chassis, a plurality of pulleys on said chassis, cylinders and said rams, a cable trained over said pulleys, one end of said cable attached to one of said rams and the other end of said cable attached to another of said rams so that each cable end is movable therewith, said load moving member attached to said cable for movement thereby so that the distance that said load moving member can be moved is greater than the stroke of any of the rams.

2. A device according to claim 1 wherein two pairs of single acting hydraulic rams are provided, and one of each pair being for movement of said cable and moving member in one direction and one for movement of said cable and moving member in the opposite direction.

3. A device according to claim 1 wherein said cable is actuated by one or more double acting hydraulic rams, each ram on one stroke effecting movement of said moving member in one direction and on the return stroke, effecting movement of said moving member in the opposite direction.

4. A device according to claim 1 wherein the pulleys are located and cable positoned so that said moving member can be moved through the entire length of the chassis.

5. A device according to claim 1 wherein said moving member is mounted on anti-friction means to facilitate movement of said moving member.

References Cited
UNITED STATES PATENTS

| | | | |
|---|---|---|---|
| 773,332 | 10/1904 | Merrell | 214—83.34 |
| 1,375,535 | 4/1921 | Ortgier | 214—83.34 |
| 2,140,974 | 12/1938 | Wagner et al. | 214—83.34 |
| 2,353,948 | 7/1944 | Swift | 214—83.34 |
| 2,530,350 | 11/1950 | Ehlert | 214—82 |
| 2,595,395 | 5/1952 | Lavelle et al. | 214—83.34 |
| 2,729,346 | 1/1956 | German | 214—82 X |
| 3,220,698 | 11/1965 | Carder | 214—512 X |
| 3,240,370 | 3/1966 | Sadler | 214—83.34 |
| 2,318,886 | 5/1943 | Paiement | 214—82 |
| 3,021,968 | 2/1962 | Myers | 214—82 |
| 3,049,378 | 8/1962 | Nelson | 214—517 XR |

ALBERT J. MAKAY, Primary Examiner

U.S. Cl. X.R.
254—189